United States Patent
Lew et al.

[11] Patent Number: 5,407,214
[45] Date of Patent: Apr. 18, 1995

[54] FIRE BARRIER GASKET SEAL

[76] Inventors: Hyok S. Lew; Yon S. Lew, both of 7890 Oak St., Arvada, Colo. 80005

[21] Appl. No.: 815,706

[22] Filed: Dec. 31, 1991

[51] Int. Cl.⁶ .............................................. F16L 55/00
[52] U.S. Cl. ....................................... 277/26; 277/227; 277/235 R; 285/187
[58] Field of Search ............... 277/26, 227, 228, 229, 277/233, 235 R, 235 A, 235 B, 207 R, 207 A; 285/910

[56] References Cited

U.S. PATENT DOCUMENTS

| | | | |
|---|---|---|---|
| 1,635,482 | 7/1927 | Joyce | 277/228 |
| 2,074,388 | 3/1937 | Gordon | 277/235 B |
| 2,299,813 | 10/1942 | Franks | 277/901 |
| 2,459,720 | 1/1949 | Poltorak | 277/227 |
| 3,989,285 | 11/1976 | Yancey | 277/235 R |
| 4,156,533 | 5/1979 | Close et al. | 277/229 |
| 4,223,897 | 9/1980 | Stab et al. | 277/235 B |
| 4,756,561 | 7/1988 | Kawata et al. | 285/187 |
| 4,776,600 | 10/1988 | Kohn | 277/901 |
| 4,795,174 | 1/1989 | Whitlow | 277/235 B |

Primary Examiner—Daniel G. DePumpo

[57] ABSTRACT

A gasket seal comprises a hollow metallic annular member with hollow interior filled with a thermally expanding material and exterior surface surface thereof lined with a resilient layer of sealing material; wherein the contact pressure between the resilient layer of sealing material and metallic surfaces sealed by the gasket seal, that is imposed by the fastening employed in joining the metallic surfaces, provides the sealing under normal conditions, while the additional contact pressure exerted by the thermal expansion of the thermally expanding material contained in the hollow metallic annular member as a result of an elevated temperature provides the sealing in case of fire.

15 Claims, 2 Drawing Sheets

FIRE BARRIER GASKET SEAL

BACKGROUND OF THE INVENTION

One of the most common methods for connecting sections of pipes, valves, flowmeters, and other flow measuring and handling apparatus into a pipe-line uses pipe flanges included in adjacent ends of the individual pipe sections, which are fastened to one another by a plurality of tie rods. In general, the pipe flange couplings require a gasket made of a resilient material placed between the faces of two coupled pipe flanges or a ring seal made of a resilient material placed in an annular groove included in one or both faces of two coupled pipe flanges. In many applications, the pipelines carry combustible media and are subjected to the ever existing danger of fire. In case of fire, the gaskets or ring seals made of combustible synthetic materials melt or burn and spring a leak of the combustible media through the pipe flange joints, and valve stem seals, which leak propagates fire burning in the ambient surroundings to the interior of the pipe line of the fire burning in the interior region of the pipe-line to the ambient surroundings, that often results in a catastrophic fire and destruction. The conventional gaskets or seals of fire proof rating are made of noncombustible material providing a resilience in the structure of the gasket or seal such as the graphite foils, metallic wires braided or woven into a form of the gasket or seal, or laminated metallic sheets coiled into a gasket. While these various types of the conventional fire proof gaskets and seals do not melt or burn, they often spring a leak in case of fire because the tie rods connecting the pipe flanges become elongated by the elevated temperature and the conventional fire proof gaskets or ring seals lack the resiliency that is required to fill up the now expanded gap between the faces of the two joined pipe flanges due to the thermal elongation of the tie rods fastening the two pipe flanges to one another. New pipe flange gaskets, ring seals and sleeve seals providing a greater protection from leaks in case of fire as well as in normal operations are in great demand as such fire barrier gaskets and seals can provide much required insurance against fire damage that can escalate into a loss of millions of dollars.

BRIEF SUMMARY OF THE INVENTION

The primary object of the present invention is to provide a pipe flange gasket, ring seal or sleeve seal, that comprises resilient layers or surfaces providing sealing under normal temperatures as well as elevated temperatures caused by fire and a layer intermediate the resilient layers or surfaces that expands under the elevated temperatures by a thermal expansion of solid phase or by a phase change from the solid state to a fluid or plastic state due to the elevated temperatures.

Another object is to provide the pipe flange gasket, ring seal and sleeve seal, which include one or more resilient layers or lining of a resilient dielectric material that cuts off flow of electric currents between the two metallic surfaces separated by the gasket, ring seal or sleeve seal, and thus prevents galvanic corrosion on the metallic surfaces.

A further object is to provide a ring seal that includes a planar annular extension including resilient layers or surfaces providing the sealing and a layer intermediate the resilient layers or surfaces that expands under elevated temperatures and enhances the sealing by the resilient layers or surfaces by exerting additional pressures between the resilient layers or surfaces and the metallic surfaces of the pipe flanges or other metallic surfaces requiring the sealing.

These and other objects of the present invention will become clear as the description thereof progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
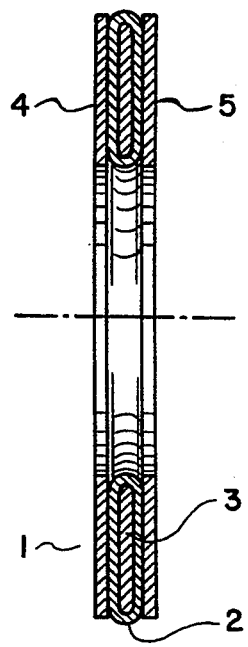
FIG. 1 illustrates a cross section of an embodiment of the gasket seal of the present invention, comprising a substantially flat, hollow, metallic annular member filled with thermally expanding material, which metallic annular member is sandwiched between two annular layers of resilient noncombustible material providing the sealing.

FIG. 1 illustrates a cross section of an embodiment of the gasket seal of the present invention, that describes the principles of the present invention teaching how to construct an annular seal comprising a thermally expanding layer sandwiched between two resilient layers, wherein the two resilient layers respectively under a pressurized contact with the metallic faces of two joined pipe flanges provides the sealing, while the thermally expanding layer exerts an additional sealing pressure between the metallic surfaces of the pipe flanges and the resilient sealing layers in case of fire and thus provides the fire proof quality seal. The fire barrier gasket seal 1 of the present invention includes a substantially flat hollow metallic planar member 2 having a cross section of hollow oblong shape, that is filled with a thermally expanding material 3, and two substantially flat annular layers 4 and 5 of resilient material providing the sealing. The hollow metallic annular member 2 should be made of corrosion resistant material such as stainless steel, copper, bronze, brass, etc., and must have a thin flexible wall. The thermally expanding material 3 may be a compressed fluid or a solid with a high thermal expansion coefficient such as aluminum, copper, lead, and other metals of low melting temperature, or synthetic materials, that expands by solid state thermal expansion or solid to fluid phase transition. The resilient layers or linings 4 and 5 may be combustible resilient sealing materials such as the rubber, teflon, leather etc., or noncombustible resilient sealing materials such as the graphite sheet, asbestos sheet, graphite impregnated woven or braided metallic wires, etc. The hollow metallic annular member 2 may have walls of rippled construction of coaxial geometry as shown in FIG. 3, or it may be completely covered by a lining of resilient material as shown in FIG. 4.

Figure 2:
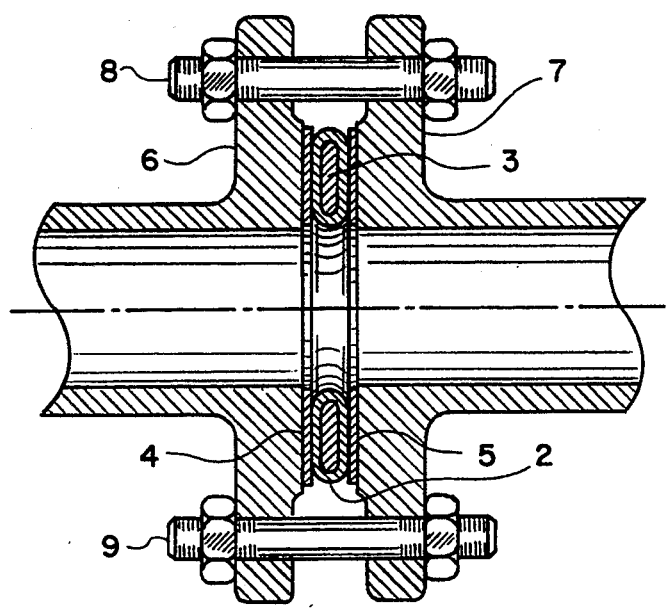
FIG. 2 illustrates a cross section of the gasket shown in FIG. 1, that is now installed between two pipe flanges.

FIG. 2 illustrates the gasket seal shown in FIG. 1, that is now installed between two pipe flanges 6 and 7 joined together by a plurality of tie rods 8, 9, etc. Under normal conditions, the contact pressure between the surfaces of the pipe flanges 6 and 7 and the resilient layers 4 and 5 provided by and resulting from the tightening of the nuts on the tie rods 8, 9, etc. provides the sealing. In the case of fire wherein the contact pressure provided by the tightening of the tie rods partially or completely disappears due to the thermal elongation of the tie rods, the thermally expanding material 3 expanding under elevated temperatures inflates the hollow metallic member 2 and produces the contact pressure between the surfaces of the pipe flanges and the resilient outer layers of the gasket, When the resilient layers 4 and 5 are made of a combustible material, the sealing at elevated temperature is provided by the metal-to-metal sealing between the surfaces of the pipe flanges and the surface of the hollow metallic annular member 2, wherein the residue of the combusted resilient layers 4 and 5 trapped between the two metallic surfaces further enhances the sealing. When the resilient layers 4 and 5 are made of a noncombustible material, the sealing at elevated temperature is provided by the resilient layers 4 and 5 under an elevated contact pressure resulting from the expansion of the thermally expanding material 3.

Figure 3:
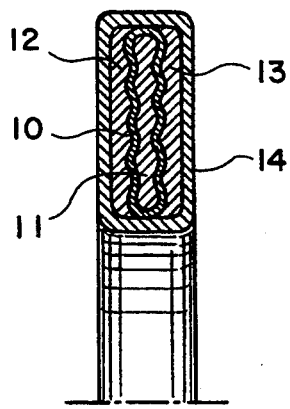
FIG. 3 illustrates a cross section of a modified version of the gasket shown in FIG. 1, that now includes a lining of resilient dielectric material.

FIG. 3 illustrates a cross section of a modified version of the gasket seal shown in FIG. 1. In this embodiment the hollow metallic annular member 10 filled with a thermally expanding material 11, that is sandwiched between two resilient layers 12 and 13 made of a noncombustible material, has two end walls having rippled construction of a concentric geometry, which combination is then completely lined with a layer 14 of a combustible resilient material. This construction of the gasket seal provides an advantage over that shown in FIG. 1 in view of that the sealing at normal conditions is provided by the lining 14 made of a combustible resilient dielectric material such as rubber, teflon, leather, etc., that provides a superior sealing compared with the noncombustible resilient material constituting the two layers 12, and 13, which two layers provides the sealing in case of fire when the combustible lining 14 burns up. The dielectric lining 14 cuts off galvanic electric current flow between the two pipe flanges separated thereby and, consequently, prevents galvanic corrosion on the pipe flanges.

Figures 4, 5:
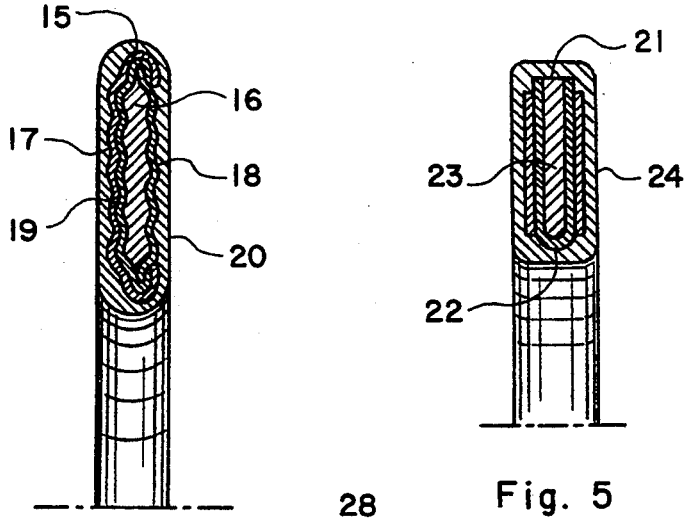
FIG. 4 illustrates a cross section of another modified version of the gasket shown in FIG. 1, that now has the resilient sealing layers completely lining the hollow metallic annular member filled with a thermally expanding material.
FIG. 5 illustrates a cross section of a further modified version of the gasket shown in FIG. 1, which now includes the hollow metallic annular member filled with a thermally expanding material that has an open outer edge.

FIG. 4 illustrates a cross section of another modified version of the gasket seal shown in FIG. 1. This embodiment includes the hollow metallic annular member 15 including a thermally expanding material 16 made of two rippled metallic annular sheets 17 and 18, which two sheets are joined together at the two edges thereof by crimping. One of the two metallic annular sheets 17 is lined with a sealing layer 19 that provides sealing at the edges of the crimped joint. The hollow metallic annular member is lined all around with a layer 20 of a resilient material, which may be combustible or noncombustible. The combination shown in FIG. 4 may be further lined all around with a layer of resilient dielectric material in order to further enhance the sealing and to prevent galvanic corrosion on the pipe flanges and pipe-line.

FIG. 5 illustrates a cross section of a further modified version of the gasket seal shown in FIG. 1. This embodiment has essentially the same construction as the gasket seal shown in FIG. 3 with two exceptions, which are, firstly, the outer edge 21 of the hollow annular metallic member 22 is open and secondly, the hollow metallic annular member 22 has smooth end walls without any ripples. As the outer edge 21 of the hollow metallic annular member 22 is open, the thermally expanding material 23 has to be limited to a noncombustible solid with a high thermal expansion coefficient. Of course, the exterior lining 24 of resilient dielectric material may be included as shown in the particular illustrative embodiment or may be omitted in an economic version thereof.

Figure 6:
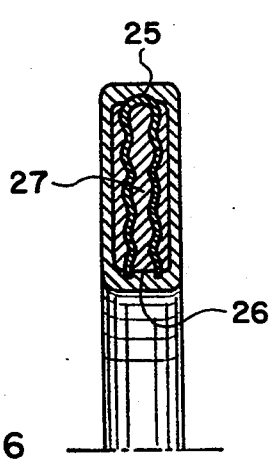
FIG. 6 illustrates a cross section of a modified version of the gasket shown in FIG. 3, which now includes the hollow metallic annular member filled with a thermally expanding material, that has an open inner edge.

FIG. 6 illustrates a cross section of a modified version of the gasket seal shown in FIG. 3. This embodiment has the hollow metallic annular member with an open inner edge 26. The thermally expanding material 27 has to be limited to a noncombustible solid with a high thermal expansion coefficient.

Figure 7:
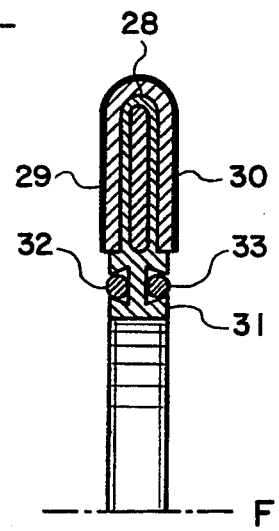
FIG. 7 illustrates a cross section of a gasket having a construction similar to the gasket shown in FIG. 1, that now includes the hollow metallic annular member with a reinforced inner edge including pair of ring seals.

FIG. 7 illustrates a cross section of an embodiment of the gasket seal having a construction similar to that shown in FIG. 1 plus a pair of resilient ring seals. The inner edge of the hollow metallic annular member 28 sandwiched between two resilient layers 19 and 30 has an extension 31 that has a thickness larger than the thickness of the hollow metallic annular member 28 and slightly smaller than the out-to-out dimension between the two resilient layers 29 and 30. The two opposite faces of the extension 31 respectively includes two annular grooves receiving two ring seals 32 and 33, respectively, which ring seals may be O-ring seals or energized U-cup seals.

Figure 8:
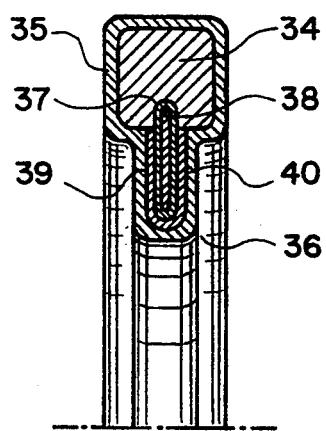
FIG. 8 illustrates a cross section of a ring seal with a substantially flat annular extension having a structure similar to the gasket shown in FIG. 1.

FIG. 8 illustrates a cross section of a modified version of the ring seals commonly employed in sealing the pipe flange joints in the crude oil and fuel pipe lines at the present time wherein the face of each pipe flange includes an annular groove of sizable width and depth designed to receive one half of the cross section of the sealing ring having a rigid metallic core ring 34 and a thick rubber lining 35. In this modified version taught by the present invention, the inner edge of the sealing ring 34 has a planar annular extension 36 that includes the hollow metallic annular member 37 filled with a thermally expanding material 38, which combination is sandwiched between two resilient layers 39 and 40 of noncombustible material. The rubber lining 35 may line the exterior of the planar extension as well as the sealing ring, which provides the sealing at the normal conditions while the noncombustible resilient layers 39 and 40 provides the sealing in case of fire when the rubber lining 35 burns out. It should be noticed that the hollow metallic annular member is retained in position, as it is snapped into an annular groove disposed following the inner edge of the metallic core 34 of the sealing ring. The planar annular extension 36 may be included at the outer edge of the sealing ring 34 in place of or in addition to the planar annular extension included at the inner edge of the sealing ring 34.

Figure 9:
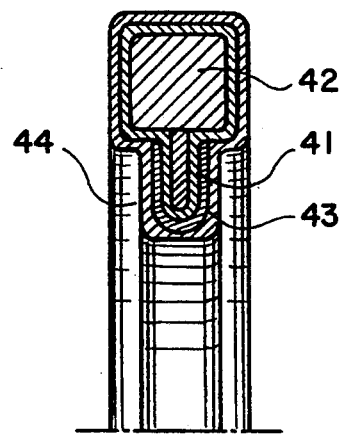
FIG. 9 illustrates a cross section of another ring seal with a substantially flat annular extension having a structure similar to the gasket shown in FIG. 1.

FIG. 9 illustrates a cross section of a modified version of the combination shown in FIG. 8. In this embodiment, the thin metallic sheet forming the hollow metallic annular member 41 is extended to wrap around the metallic core 42 of the sealing ring, and the noncombustible resilient lining 43 of U-shaped cross section covers up the two faces and inner edges of the planar annular extension. The rubber lining covers up the entire exterior surfaces of the combination of the sealing ring 42 and the planar annular extension 44 thereof.

Figure 10:
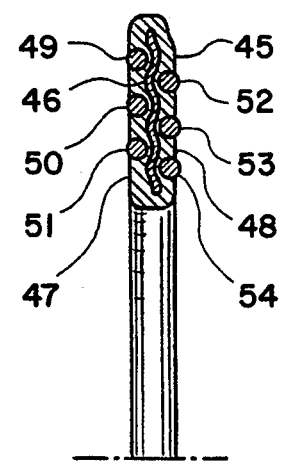
FIG. 10 illustrates a cross section of an embodiment of the gasket seal of the present invention comprising a substantially flat hollow metallic annular member filled with a thermally expanding material, which includes a plurality of ring seals disposed in a plurality of annular grooves formed into the two opposite faces thereof.

FIG. 10 illustrates a cross section of another embodiment of the gasket seal of the present invention. The hollow metallic annular member 45 filled with a thermally expanding material 46 has two face walls 47 and 48 with a sizable thickness with concentrically disposed grooves on two thin face walls with concentrically grooved construction. A plurality of resilient ring seals 49, 50, 51, 52, 53, 54, etc. made of combustible or noncombustible material is disposed in grooves included in the two opposite faces of the hollow metallic annular member 45.

Figure 11:
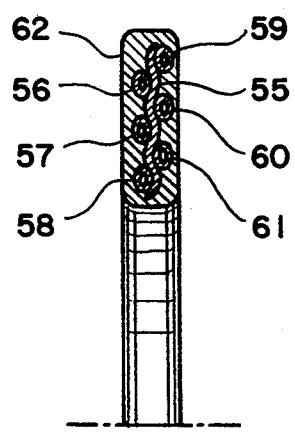
FIG. 11 illustrates a cross section of an embodiment of the gasket seal of the present invention comprising an annular metallic planar member with a plurality of grooves receiving a plurality of hollow metallic O-ring seals disposed on the two opposite faces thereof, which combination is covered with a resilient material into the shape of a flat gasket.

FIG. 11 illustrates a cross section of a further embodiment of the gasket seal of the present invention. A planar metallic annular member 55 with concentrically grooved construction includes a plurality of hollow metallic O-ring seals 56, 57, 58, 59, 60, 61, etc. disposed in the annular grooves included in the two opposite faces thereof, which combination is then covered with a resilient material 62 into the form of a generally flat gasket. The resilient material 62 may be a combustible material such as rubber, teflon, leather, etc. or a noncombustible material such as graphite or asbestos. The gas contained in the hollow metallic O-ring expands at elevated temperatures and enhances the sealing. Of course, the planar annular metallic annular member 55 may be made of a metal of high thermal expansion coefficient in order to further enhance the sealing at elevated temperatures.

Figure 12:
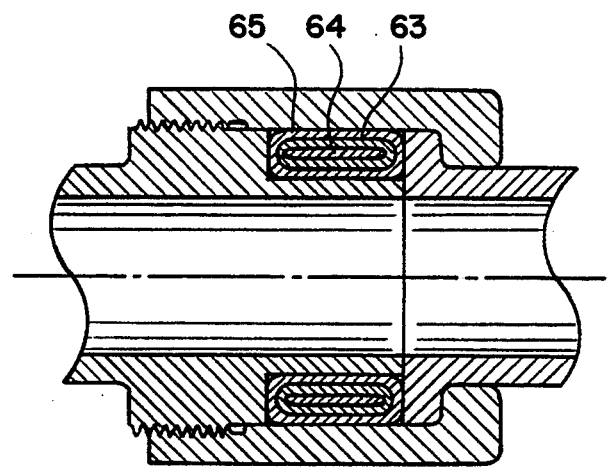
FIG. 12 illustrates a cross section of an embodiment of the ring seal or sleeve seal of the present invention comprising a hollow metallic ring or sleeve filled with thermally expanding material, that is lined with a resilient material providing the sealing between two coaxial metallic surfaces.

FIG. 12 illustrates a cross section of an embodiment of the ring seal or sleeve seal of the present invention, that can be used to seal a lap joint of two pipes or to seal valve stems extending through the valve body, which comprises a hollow metallic ring or sleeve 63 filled up with a thermally expanding material 64 that expands at elevated temperatures by a high solid or fluid state thermal expansion or volumetric expansion in the phase change from the solid state to plastic or fluid state. The exterior surface of the hollow metallic ring or sleeve 63 is lined with a resilient layer 65 of a combustible or noncombustible material, which combination may be further lined with a resilient dielectric material when the resilient layer 65 is made of a noncombustible material such as graphite. When the thermally expanding material 64 is a combustible material that expands as its phase changes from solid state to gaseous state, the ring or sleeve seal shown in FIG. 12 can be used to produce a permanent leak-proof sealing by intentionally heating the joint after installing the sealing joint.

Figure 13:
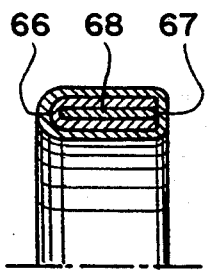
FIG. 13 illustrates a cross section of a modified version of the ring seal or sleeve seal shown in FIG. 12, which now has the hollow metallic ring or sleeve filled with a thermally expanding material, that has an open edge.

FIG. 13 illustrates a cross section of a modified version of the ring or sleeve seal shown in FIG. 12. This embodiment has the hollow metallic ring or sleeve 66 with one open edge 67. In this embodiment, the thermally expanding material 68 has to be limited to a non-combusting solid with a high thermal expansion coefficient.

Figure 14:
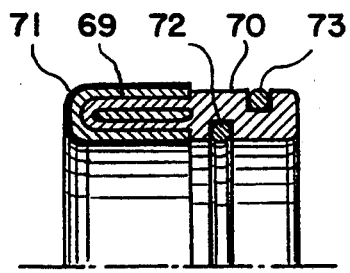
FIG. 14 illustrates a cross section of a modified version of the ring seal or sleeve seal shown in FIG. 1, which now has the hollow metallic ring or sleeve with one reinforced edge that includes a plurality of resilient ring seals disposed in annular grooves formed thereon.

FIG. 14 illustrates a cross section of a modified version of the ring or sleeve seal shown in FIG. 12. In this embodiment, one edge of the hollow metallic ring or sleeve 69 includes an extension 70 with a thickness greater than the thickness of the hollow metallic ring or sleeve 70 and slightly less than the out-to-out dimension between the resilient lining 71 of U-shaped cross section. The inner and outer cylindrical surfaces of the extension includes annular grooves receiving the resilient ring seals 72 and 73, which provide the primary sealing in the normal conditions while the resilient lining 71 provides the sealing at elevated temperatures.

Figure 15:
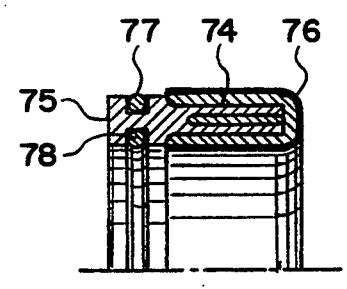
FIG. 15 illustrates a cross section of a modified version of the ring seal or sleeve seal shown in FIG. 14.

FIG. 15 illustrates a cross section of a modified version of the ring seal or sleeve seal shown in FIG. 13. The closed edge of the hollow metallic ring or sleeve 74 includes an extension 75 with a thickness greater than the thickness thereof and slightly less than the out-to-out dimension of the resilient lining 76 of U-shaped cross-section. The inner and outer cylindrical surfaces of the extension 75 include annular grooves receiving the resilient ring seals 77 and 78.

While the principles of the present invention have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. A gasket seal providing a seal between two pipe flanges connected to one another, comprising in combination:
   a) a closed annular metallic enclosure of planar geometry including two opposite thin annular metallic walls connected to one another along an inner circular edge and an outer circular edge of combination of said walls in a leak-proof relationship, which defined sealed-off annular cavity of planar geometry disposed intermediate the two opposite thin annular metallic walls; wherein dimension between the two opposite thin annular metallic walls is substantially smaller than dimension between the inner and outer edges of the closed annular metallic enclosure of planar geometry, and the closed annular metallic enclosure of planar geometry encloses the annular cavity of planar geometry in a leak-proof sealing relationship;
   b) a layer of thermally expanding material disposed within the annular cavity of planar geometry in a confined relationship, said thermally expanding material having a coefficient of thermal expansion substantially greater than coefficient of thermal expansion of the metallic material making up the closed annular metallic enclosure of planar geometry; and
   c) a first layer of deformable material at least partially covering external surface of one of the two opposite thin annular metallic walls and a second layer of deformable material at least partially covering external surface of the other of the two opposite thin annular metallic walls.

2. A gasket seal as defined in claim 1 wherein a layer of dielectric material covers entire external surface of said combination.

3. A gasket seal as defined in claim 1 wherein said first and second layer of deformable material are made of a dielectric material, and cover entire external surface of said combination.

4. A gasket seal as defined in claim 1 wherein each of said first and second layer of deformable material is disposed in at least one annular pattern coaxial to the closed annular metallic enclosure of planar geometry.

5. A gasket as defined in claim 4 wherein layer of dielectric material covers entire external surface of said combination.

6. A gasket as defined in claim 1 wherein each of the two opposite thin annular metallic walls has a corrugated construction including a plurality of circular valleys and ridges coaxial to the closed annular metallic enclosure of planar geometry.

7. A gasket as defined in claim 6 wherein a layer of dielectric material covers entire external surface of said combination.

8. A gasket as defined in claim 6 wherein said first and second layer of deformable material are made of a dielectric material, and covers entire external surface of said combination.

9. A gasket as defined in claim 6 wherein each of said first and second layer of deformable material is disposed in at least one annular pattern coaxial to the closed annular metallic enclosure of planar geometry.

10. A gasket as defined in claim 9 wherein a layer of dielectric material covers entire external surface of said combination.

11. A gasket seal as defined in claim 1 wherein one of the inner and outer circular edges of the closed annular metallic enclosure of planar geometry includes an annular metallic ring affixed thereto in a coaxial relationship, and two resilient annular seals respectively confined in two annular grooves respectively included in two opposite sides of said annular metallic ring.

12. A gasket seal as defined in claim 1 wherein the outer edge of the closed annular metallic enclosure of planar geometry includes an annular metallic ring lined with a layer of deformable material and affixed thereto in a coaxial relationship.

13. A gasket as defined in claim 12 wherein a layer of dielectric material covers entire external surface of said combination.

14. A gasket as defined in claim 1 wherein each of the two opposite thin annular metallic walls includes at least one resilient annular seal confined in an annular groove included in external side of said each of the two opposite thin annular metallic walls.

15. A gasket as defined in claim 14 wherein a layer of dielectric material covers entire external surface of said combination.

* * * * *